(12) United States Patent
Kawano et al.

(10) Patent No.: US 10,690,150 B2
(45) Date of Patent: Jun. 23, 2020

(54) PUMP DEVICE

(71) Applicant: NIPPON OIL PUMP CO., LTD., Kumagaya-shi (JP)

(72) Inventors: Yuji Kawano, Kumagaya (JP); Makoto Yoshida, Kumagaya (JP)

(73) Assignee: NIPPON OIL PUMP CO., LTD., Kumagaya-shi (JP)

( * ) Notice: Subject to any disclaimer, the term of this patent is extended or adjusted under 35 U.S.C. 154(b) by 1025 days.

(21) Appl. No.: 14/907,390

(22) PCT Filed: Jul. 11, 2014

(86) PCT No.: PCT/JP2014/068562
§ 371 (c)(1),
(2) Date: Jan. 25, 2016

(87) PCT Pub. No.: WO2015/012126
PCT Pub. Date: Jan. 29, 2015

(65) Prior Publication Data
US 2016/0169250 A1    Jun. 16, 2016

(30) Foreign Application Priority Data
Jul. 26, 2013 (JP) ................................ 2013-155324

(51) Int. Cl.
*F04D 29/70* (2006.01)
*F04D 1/06* (2006.01)
(Continued)

(52) U.S. Cl.
CPC .............. *F04D 29/70* (2013.01); *F04D 1/06* (2013.01); *F04D 7/045* (2013.01); *F04D 13/14* (2013.01);
(Continued)

(58) Field of Classification Search
CPC .......... F04B 23/08; F04B 23/12; F04B 23/14; F04B 23/023; F04B 53/20;
(Continued)

(56) References Cited

FOREIGN PATENT DOCUMENTS

FR    1349706 A  *  1/1964  ............... F04D 7/04
FR    1349706 A     1/1964
(Continued)

OTHER PUBLICATIONS

International Search Report for International Application No. PCT/JP2014/068562 dated Oct. 7, 2014.
(Continued)

*Primary Examiner* — Patrick Hamo
*Assistant Examiner* — Chirag Jariwala
(74) *Attorney, Agent, or Firm* — Kratz, Quintos & Hanson, LLP (57) ABSTRACT

The purpose of the present invention is to provide a pump device that has a function to separate foreign matter from a working fluid in which foreign matter is mixed and that is capable of supporting a large working fluid flow rate. The present invention includes a first pump that is provided above a working fluid reservoir, and a second pump that has a rotary shaft that is concentric with a rotary shaft of the first pump and that is provided further down than an inlet of the first pump. A centrifuge filtration device having functionality to separate foreign matter from the working fluid is provided in an area below the inlet of the first pump and above the second pump, and the centrifuge filtration device is disposed so that the inner diameter on the second pump side is large and the inner diameter on the first pump side is small.

4 Claims, 4 Drawing Sheets

(51) Int. Cl.
*F04D 13/14* (2006.01)
*F04D 7/04* (2006.01)
*F04D 13/16* (2006.01)
*F04D 29/043* (2006.01)
*F04D 29/22* (2006.01)
*C02F 1/38* (2006.01)

(52) U.S. Cl.
CPC ........... *F04D 13/16* (2013.01); *F04D 29/043* (2013.01); *F04D 29/22* (2013.01); *F04D 29/708* (2013.01); *C02F 1/385* (2013.01)

(58) Field of Classification Search
CPC .. B01D 17/0217; B01D 21/267; B01D 45/12; B04C 3/04; B04C 5/26; F04D 1/06; F04D 7/045; F04D 13/14; F04D 13/16; F04D 29/043; F04D 29/22; F04D 29/70; F04D 29/701; F04D 29/708; F04D 29/40; F04D 29/403; F04D 29/406; C02F 1/38; C02F 1/385

USPC ............... 417/201, 203, 206, 313; 210/512.2
See application file for complete search history.

(56) References Cited

FOREIGN PATENT DOCUMENTS

| | | |
|---|---|---|
| JP | 2005-279609 A1 | 10/2005 |
| WO | WO-2008002057 A1 * | 1/2008 ................ C02F 1/38 |
| WO | 2012/004873 A1 | 1/2012 |
| WO | 2012/053066 A1 | 4/2012 |
| WO | 2012/053231 A1 | 4/2012 |

OTHER PUBLICATIONS

European Patent Application No. 14829898.7: Supplementary European Search Report dated Feb. 21, 2017.

* cited by examiner

PUMP DEVICE

TECHNICAL FIELD

The present invention relates to a pump that sucks and discharges a liquid, and more particularly to a pump device having a function of separating foreign matters (e.g., chips) from a working fluid (e.g. a liquid such as rinse water or a coolant of a machine tool) having the foreign matters mixed therein.

PRIOR ART

As a pump device including the above-mentioned constructions, there is suggested a pump device which is a lightweight small pump device requiring no periodic maintenance, which has a positive displacement pump, a non-positive displacement pump, a primary cyclone, and a secondary cyclone provided therein, and in which a mechanism (an outlet) that discharges separated foreign matters (e.g., chips) is provided in each of the primary cyclone and the secondary cyclone, a discharge flow rate of the non-positive displacement pump is set to be higher than a discharge flow rate of the positive displacement pump, and said positive displacement pump, said cyclone filter, and said non-positive displacement are arranged to be linearly coupled in a vertical direction (see Patent Literature 1).

This pump device (Patent Literature 1) is useful.

However, there is a demand for a high flow rate in coolant processing of a machine tool in recent years. On the other hand, in the above-described pump device, a working fluid is processed by a positive displacement pump like a so-called "trochoidal pump (gear pump)", a processing flow rate is small, and meeting the demand for a high flow rate in the coolant processing is difficult.

CITATION LIST

Patent Literature

Patent Literature 1: International Publication No. WO 2012/053231

SUMMARY OF INVENTION

Problem to be Solved by the Invention

In view of the above-described problem of the prior art, it is an object of the present invention to provide a pump device that has a function of separating foreign matters (e.g., chips or dirt) from a working fluid (e.g., a liquid such as rinse water or a coolant of a machine tool) having the foreign matters mixed therein and that is capable of supporting a large working fluid flow rate.

Means for Solving Problem

A pump device according to the present invention includes:

a first pump (5: e.g., a centrifugal pump having impeller blades) provided above a working fluid (e.g., a coolant) reservoir (e.g., a coolant tank); and a second pump (e.g., a centrifugal pump such as an impeller: a bottom suction impeller 1) that has a rotary shaft concentric with a rotary shaft (8) of the first pump (5), and is provided below (the upstream side) an inlet (5i) of the first pump (5), and the pump device is characterized in that:

a centrifugal filtration device (a cyclone 3) having a function of separating foreign matters from a working fluid is provided in a region that is above the second pump (1) and below the inlet (5i) of the first pump (5);

the centrifugal filtration device (3) is arranged so that its inner diameter (D3) on the second pump (1) side (the lower side) becomes large and its inner diameter (d3) on the first pump (5) side (the upper side) becomes small, and said centrifugal filtration device (3) is provided at a position where the working fluid discharged from the second pump (1) directly flows into the centrifugal filtration device (a region where the inner diameter of 3 is large or a region on the second pump 1 side); and a suction piping (a cleaning liquid suction pipe 31) of the first pump (5) is extended to the vicinity of the second pump (1) along a center axis (in the vertical direction) of the centrifugal filtration device (3), the suction piping (31) (of the first pump 5) communicates with the inlet (5i) of the first pump (5), and an outlet (3o) for a fluid containing foreign matters is provided near an end portion of said centrifugal filtration device (3) on the first pump (5) side (the upper side).

In the present invention, only one centrifugal filtration device (the cyclone 3) is provide in a region above the second pump (1) and below the inlet (5i) of the first pump (5).

Further, in the present invention, it is preferable for the outlet (3o) for the fluid containing foreign matters provided near the end portion of said centrifugal filtration device (3) on the first pump (5) side (the upper side) to communicate with a foreign matter outlet (68H) through a flow passage (9) for the fluid containing foreign matters.

Furthermore, in the present invention, it is preferable that a guide member (31B) is extended in the suction piping (the cleaning liquid suction pipe 31) of the first pump (5) along a direction of the center axis (an up-and-down direction), a region (L1) of the guide member (31B) on the second pump side (the lower side) is spirally extended, and a region (L2) of the same on the first pump side (the upper side) is linearly extended.

Moreover, in the present invention, it is preferable for a truncated conical member (a cone member 32) is arranged at an end portion of the centrifugal filtration device (the cyclone 3) on the first pump (5) side (the upper side) so that an apex of its conical shape faces the second pump side (the lower side).

At the time of embodying the present invention, it is preferable for a bore diameter (D31) of the suction piping (the cleaning liquid suction pipe 31) of the first pump (the centrifugal pump 5) to be 95% to 105% of a bore diameter (D51i) of the inlet (5i) of the first pump (5).

Additionally, at the time of embodying the present invention, it is preferable for a bore diameter (D12) of the second pump (the bottom suction impeller 1) to be 100% to 110% of a bore diameter (D51) of the first pump (the centrifugal pump 5).

Effect of the Invention

According to the present invention having the above-described structure, the centrifugal filtration device (the cyclone 3) is arranged in such a manner that the inner diameter (D3) on the second pump (1) side (the lower side) becomes large and the inner diameter (d3) on the first pump (5) side (the upper side) becomes small, the working fluid discharged from the second pump (1) directly flows into the centrifugal filtration device (the region where the inner diameter of 3 is large or the region on the second pump 1 side), and hence the working fluid that has directly flowed into the centrifugal filtration device (the cyclone 3) swirls by energy (head) applied to the working fluid by the second pump (1) and moves toward the first pump (5) side (the upper side) in the centrifugal filtration device (the cyclone 3).

At this time (at the time of swirling and moving toward the first pump 5 side, i.e., the upper side in the centrifugal filtration device 3), foreign matters and the working fluid are appropriately separated from each other by centrifugal force.

Since the large centrifugal force acts on foreign matters having high specific gravities such as metal chips, the foreign matters move to the vicinity of the inner peripheral portion (30i) of the centrifugal filtration device (the cyclone 3). On the other hand, since the centrifugal force acting on the clean working fluid having no foreign matter is relatively small, the clean working fluid moves in a radially inner region and then changes its direction to the second pump (1) side (the lower side).

The clean working fluid that has changed its direction to the second pump (1) side (the lower side) flows into the suction piping (the clean liquid suction pipe 31) in the region near the second pump (1), and flows into the inlet (5i) of the first pump (5).

Additionally, it is discharged as a flow of the clean working fluid from the outlet (66) of the working fluid.

In the prior art (Patent Literature 1), the working fluid that has been discharged from the non-positive displacement pump moves up in a radially outer region of the primary cyclone and then flows into the primary cyclone but, according to the present invention, since the working fluid that has flowed out of the second pump (1) directly flows into the centrifugal filtration device (the region where the inner diameter of 3 is large or the region on the second pump 1 side), a discharge flow (a discharge swirl flow) of the second pump (1) can be used as a swirl flow in the centrifugal filtration device (the cyclone 3), which is efficient. Further, since the swirl flow of the working fluid is generated in the centrifugal filtration device (the cyclone 3) by the energy (head) applied by the second pump (1), a flow velocity of the swirl flow is high, and the centrifugal separation efficiency is improved.

Furthermore, since the flow velocity of the swirl flow in the centrifugal filtration device (the cyclone 3) is high and a large flow rate of the working fluid flows into the centrifugal filtration device (the cyclone 3), foreign matters having high specific gravities contained in the working fluid are entrained by the working fluid, easily moved to the first pump (5) side (the upper side), and discharged to the outside of the centrifugal filtration device (the cyclone 3) from the outlet (3o) (for the fluid containing the foreign matters) provided near an end portion on the first pump (5) side (the upper side) through the flow passage (9) for the fluid containing foreign matters.

In the present invention, if the guide member (31B) is extended in the direction of the center axis line (a vertical direction) of the suction piping (the cleaning liquid suction pipe 31) of the first pump (5), the swirl flow with a high flow velocity in the centrifugal filtration device (the cyclone 3) can be guided, and the working fluid can be efficiently guided to the inlet (5i) on the first pump (a centrifugal pump 5) side.

Thus, even if the suction pipe inner diameter dimension (D31) is reduced, an amount of the working fluid sucked by the first pump (5) is not decreased, and a pump discharge amount is not lowered. Besides, reducing the suction pipe inner diameter dimension (D31) decreases a possibility that the working fluid containing foreign matters is sucked into the suction piping (the cleaning liquid suction pipe 31) of the first pump (5), and improves a filtration rate.

Since the region (L1) of the guide member (31B) on the second pump (8) side (the lower side) is spirally extended, a direction of the swirl flow in the centrifugal filtration device (the cyclone 3) can be changed to the first pump (5) side (the upper side) which is the axis line direction of the suction piping (the cleaning liquid suction pipe 31) (of the centrifugal pump).

Here, it is preferable that a flow of the working fluid toward a first stage (a first stage 51 on the suction side) of the first pump (the centrifugal pump 5) is a flow that is not a swirl flow (has no circumferential component). If the region (L2) of the guide member (31B) on the first pump (5) side is linearly extended, this linearly extended region cancels out the circumferential component of the working fluid flowing through the suction piping (the cleaning liquid suction pipe 31) toward the first pump side (5) side (the upper side), and the working fluid is no longer a swirl flow.

Further, in the present invention, when the truncated conical member (the corn member 32) is arranged at the end portion of the centrifugal filtration device (the cyclone 3) on the first pump side (the upper side) so that the apex of the conical shape faces the second pump (1) side (the lower side), since a radially inner region of the outlet (3o) (for the fluid containing foreign matters) provided near the end portion on the first pump (5) side (the upper side) is occupied by the truncated conical member (the corn member 32), a cross-sectional area (an annular flow passage area) of the outlet (3o) is thereby decreased, a flow rate of the working fluid containing foreign matters that is discharged from the outlet (3o) can be reduced, and a necessary flow rate of the working fluid discharged from the outlet (66) of the first pump (3) can be assured.

Furthermore, when the truncated conical member (the corn member 32) is arranged so that the apex of the conical shape faces the second pump (1) side (the lower side), the flow rate of the working fluid containing foreign matters that is discharged from the outlet (3o) can be assured, the foreign matters can be easily discharged from the pump device, and the filtration rate can be improved.

In the pump device according to the present invention, in a case that a discharge pipeline (not shown) is connected to the foreign matter outlet (68H) and an exit of this discharge pipeline is constructed to communicate with the outside of a working fluid reservoir (e.g., a coolant tank), the foreign matters separated by the centrifugal filtration device (the cyclone 3) can be easily discharged to the outside of the working fluid reservoir.

EMBODIMENTS FOR CARRYING OUT THE INVENTION

Embodiments according to the present invention will now be described hereinafter with reference to the accompanying drawings.

A first embodiment according to the present invention will be first described with reference to FIG. 1 to FIG. 4.

Figure 1:
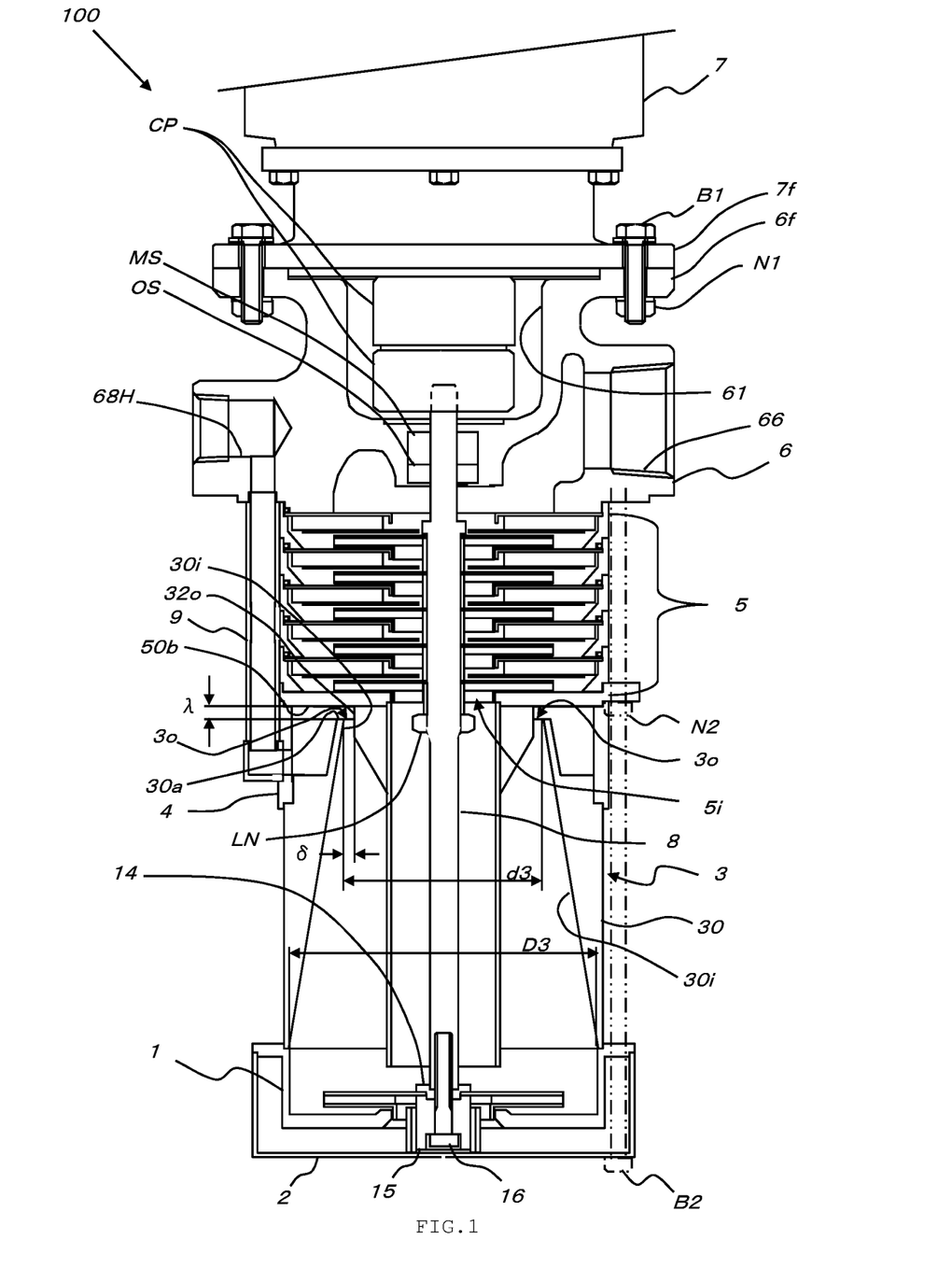
FIG. 1 is a cross-sectional view showing a first embodiment according to the present invention.

In FIG. 1, an entire pump device according to the first embodiment is denoted by reference numeral 100.

In FIG. 1, the pump device 100 includes a bottom suction impeller (a second pump) 1, a cyclone (a centrifugal separator) 3, a lower housing (a second housing) 4, a multistage centrifugal pump (a first pump) 5, an upper housing" (a first housing) 6, and an electric motor 7.

Figure 2:
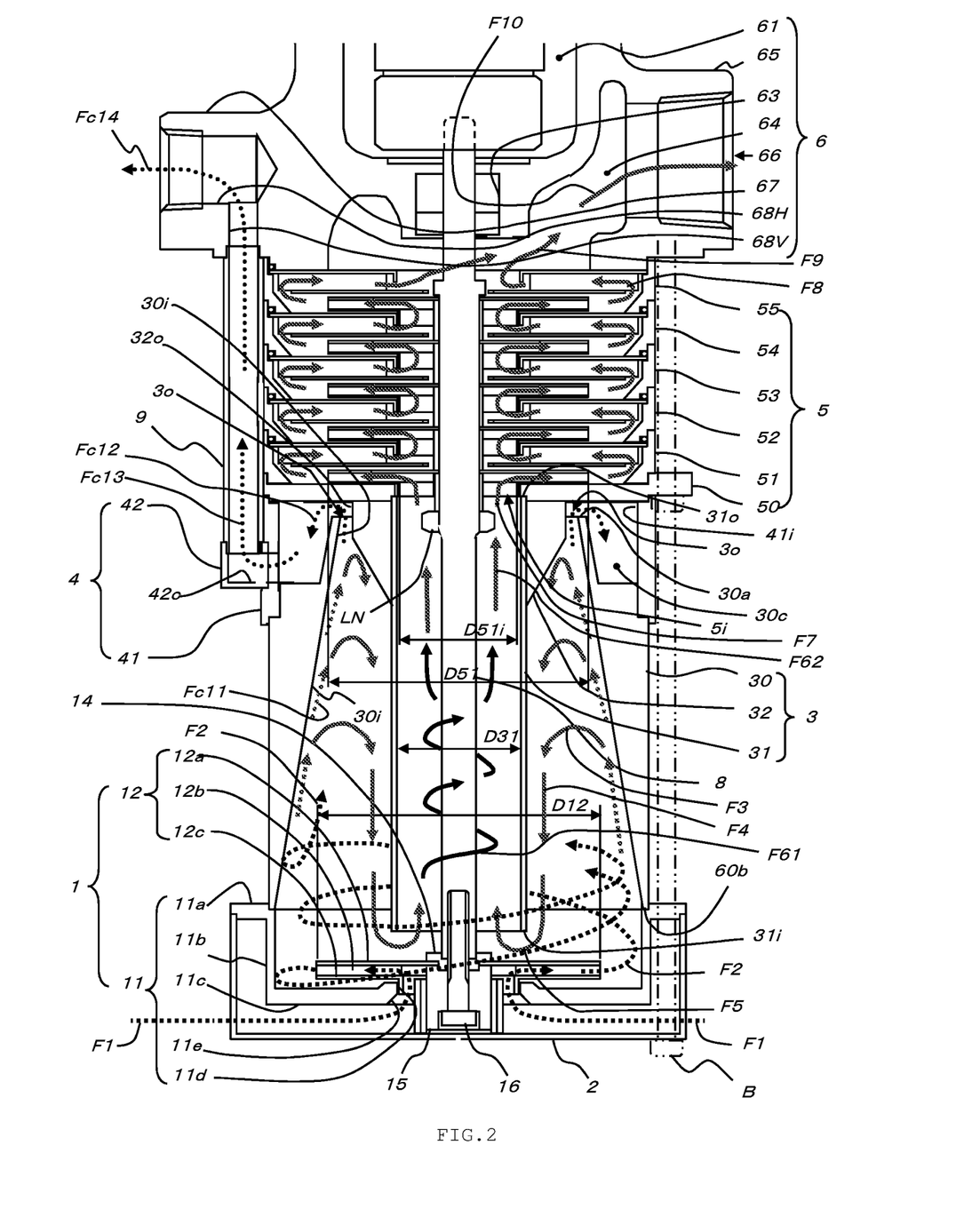
FIG. 2 is a partially enlarged cross-sectional view showing the detail of an impeller and a centrifugal filtration device in the first embodiment.

The bottom suction impeller 1, the cyclone 3, the lower housing 4, and the multistage centrifugal pump 5 in the pump device 100 are shown in FIG. 2 in detail. In FIG. 2, the bottom suction impeller 1 has an impeller housing 11 and a suction impeller main body 12.

The impeller housing 11 has an upper edge flange portion 11a, a cylinder portion 11b, and a bottom portion 11c, and a through hole 11d is formed at the center of the bottom portion 11c. A chamfer 11e is formed at a lower end corner portion of the through hole 11d.

An outer periphery of the impeller housing 11 is covered with a cover member 2 to interpose a predetermined gap therebetween. It is preferable for the cover member 2 to be made of a punching metal having many small-diameter through holes formed therein. If the through holes of the punching metal have a small diameter, foreign matters having large particle diameters can be prevented from entering the bottom suction impeller 1.

The impeller main body 12 has an upper disk 12a having a through hole at the center thereof, a plurality of blades 12b, and a lower disk 12c having a cylinder portion protruding downward at the center.

The plurality of blades 12b are sandwiched between the upper disk 12a and the lower disk 12c and arranged at equal pitches, and an upper edge portion and a lower edge portion of each blade 12b are fixed to the upper disk 12a and the lower disk 12c.

In FIG. 2, the cyclone 3 has a casing 30, a cleaning liquid suction pipe 31 extending in a vertical direction is arranged at the center of the cyclone 3 in the radial direction, and a cone member (a truncated conical member) 32 is provided at an upper end portion of the cyclone 3.

As shown in FIG. 1, an inner peripheral surface 30i of the casing 30 of the cyclone 3 is formed into a tapered shape, and an inner diameter D3 of the lower end is larger than an inner diameter d3 of the upper end (see FIG. 1). Further, as shown in FIG. 2, a working fluid discharged from the bottom suction impeller 1 directly flows into the cyclone.

In FIG. 2, a step-like notch 30c is provided near the upper end of the casing 30 of the cyclone 3. Furthermore, the step-like notch 30c and an inner periphery 41i of the lower housing 4 form a substantially annular space near the upper end of the casing 30 of the cyclone 3.

A lower end 31i of the cleaning liquid suction pipe 31 in the cyclone 3 is placed near an upper surface of the suction impeller main body 12 in the bottom suction impeller 1.

Moreover, an upper end 31o of the cleaning liquid suction pipe 31 communicates with an inlet 5i of the multistage centrifugal pump 5.

The periphery near the upper end 31o of the cleaning liquid suction pipe 31 is surrounded by the partially conical corn member 32.

The inner peripheral surface 30i of the upper end of the casing 30 and an outer peripheral surface 32o of the corn member 32 constitute an annular flow passage 3o, and this annular flow passage 3o functions as an outlet for a fluid containing foreign matters.

A width dimension δ of the annular flow passage 3o in the radial direction (see FIG. 1) is set to a predetermined value that enables assuring a flow rate required for the working fluid discharged from the annular flow passage 3o to entrain foreign matters and also enables assuring a necessary discharge amount of the multistage centrifugal pump 5.

Additionally, a gap λ (see FIG. 1) formed between a cyclone upper end 30a and a lower surface 50b of a lower partition member 50 of the multistage centrifugal pump 5 along an up-and-down direction is likewise set a predetermined value that enables assuring a flow rate required for the working fluid discharged from the annular flow passage 3o to entrain foreign matters and also enables assuring a necessary discharge amount of the multistage centrifugal pump 5.

In FIG. 2, the lower housing 4 has a cylindrical housing main body 41 and a flow passage connection connector 42.

A flow passage 42c of the flow passage connection connector 42 is connected to a vertical portion 68V of a foreign matter outlet 68H of the later-described upper housing 6 through a connection pipe 9. Here, the connection pipe 9 constitutes a flow passage for the working fluid that entrains (contains) foreign matters.

The lower housing 4 is liquid-tightly connected to the casing 30 of the cyclone 3 and the lower partition member 50 of the multistage centrifugal pump 5 by a spigot structure in the illustrated example.

In the illustrated embodiment, the multistage centrifugal pump 5 has five-stage pump units.

In FIG. 2, the multistage centrifugal pump 5 has the lower partition member 50, a first-stage pump unit 51, a second-stage pump unit 52, a third-stage pump unit 53, a fourth-stage pump unit 54, and a fifth-stage pump unit 55 liquid-tightly laminated and assembled in the up-and-down direction.

Each of the first-stage to fifth-stage pump units 51 to 55 has the same structure as the suction impeller main body 12 in the bottom suction impeller 1, and has a cylindrical housing, an upper disk, a plurality of blades, and a lower disk having a cylinder portion protruding downward at the center. In addition, each pump unit has a discoid guide plate having a plurality of guide boards.

In FIG. 2, a bore diameter D31 of the cleaning liquid suction pipe 31 is set to 95% to 105% of a bore diameter D51i of the inlet of the multistage centrifugal pump 5.

If the bore diameter D31 of the cleaning liquid suction pipe 31 is small, a filtration rate is improved, but a negative pressure in the cleaning liquid suction pipe 3 is increased, the working fluid cannot be sucked by the centrifugal pump 5, and a discharge flow rate of the centrifugal pump 5 is decreased. On the other hand, if the bore diameter D31 of the cleaning liquid suction pipe 3 is large, since the negative pressure in the cleaning liquid suction pipe 3 is small, the discharge flow rate of the centrifugal pump 5 is increased, but the filtration rate is lowered.

To achieve a balance between the filtration rate and the discharge flow rate of the centrifugal pump 5, it is preferable to set the bore diameter D31 of the cleaning liquid filtration pipe 31 and the bore diameter D51i of the inlet of the multistage centrifugal pump 5 to be substantially equal to each other. Further, experiments conducted by the present inventor have revealed that, if a difference between the bore diameter D31 of the cleaning liquid suction tube 31 and the bore diameter D51*i* of the inlet of the multistage centrifugal pump 5 falls within the range of ±5%, the balance between the filtration rate and the discharge flow rate of the centrifugal pump 5 can be achieved. Thus, as described above, the bore diameter D31 of the cleaning liquid suction pipe 31 is set to 95% to 105% of the bore diameter D51*i* of the inlet of the multistage centrifugal pump 5.

Furthermore, in FIG. 2, it is preferable for the bore diameter D12 of the bottom suction impeller 1 to be 100% to 110% of the bore diameter D51 of the impeller of the multistage centrifugal pump 5.

To assure the discharge flow rate required for the centrifugal pump 5 and strengthen a swirl flow in the cyclone 3 by the working fluid discharged from the bottom suction impeller 1 for the improvement in the filtration rate, the bore diameter D12 of the bottom suction impeller 1 must be enlarged to be slightly larger than the bore diameter D51 of the impeller of the multistage centrifugal pump 5. Experiments conducted by the present inventor have revealed that, if the bore diameter D12 of the bottom suction impeller 1 is set to 100% to 110% of the bore diameter D51 of the impeller of the multistage centrifugal pump 5, the necessary discharge flow rate of the centrifugal pump 5 can be assured, and the filtration rate can be improved.

In FIG. 1, the upper housing 6 has a cylindrical hollow portion 61, and the cylindrical hollow portion 61 is opened to the upper side in FIG. 1. The cylindrical hollow portion 61 has a coupling CP accommodated therein, and the coupling CP connects an output shaft (not shown) of the electric motor 7 to a pump shaft 8.

The multistage centrifugal pump 5 and the bottom suction impeller 1 are disposed to the pump shaft 8 by publicly known means (e.g., a lock nut LN, a first pressing member 14, a second pressing member 15, and an embedded bolt 16).

In FIG. 2, a seal member storage hollow portion 63 is formed below the cylindrical hollow portion 61 of the upper housing 6. Although not clearly shown, the seal member storage hollow portion 63 stores, e.g., a mechanical seal, an oil seal, and a thrust bearing.

A working fluid discharge flow passage 64 is formed in a radially outer region of the seal member storage hollow portion 63 in the upper housing 6, and the working fluid discharge flow passage 64 communicates with a working fluid outlet 66. Here, the working fluid outlet 66 is provided in a protruding portion 65 that protrudes outward in the radial direction of the housing 6.

In the upper housing 6, a portion that protrudes outward in the radial direction is also formed on the opposite side (the left-hand side in FIG. 2) of the working fluid outlet 66, and an outlet (a foreign matter outlet) 68H is opened in this protruding portion (toward the outside in the radial direction).

The working fluid that entrains foreign matters is discharged to the outside of the pump device 100 through the foreign matter outlet 68H. As described above, the foreign matter outlet 68H communicates with the vertical portion 68V, and the vertical portion 68V communicates with the connection pipe 9.

In FIG. 1, an upper end flange 6*f* of the upper housing 6 is connected with a flange 7*f* of the electric motor 7 through bolts B1 and nuts N1.

Further, the multistage centrifugal pump 5, the lower housing 4, the cyclone 3, and the bottom suction impeller 1 are fixed to the upper housing 6 through a plurality of through bolts (studs bolts) B2 and nuts N2.

Figure 3:
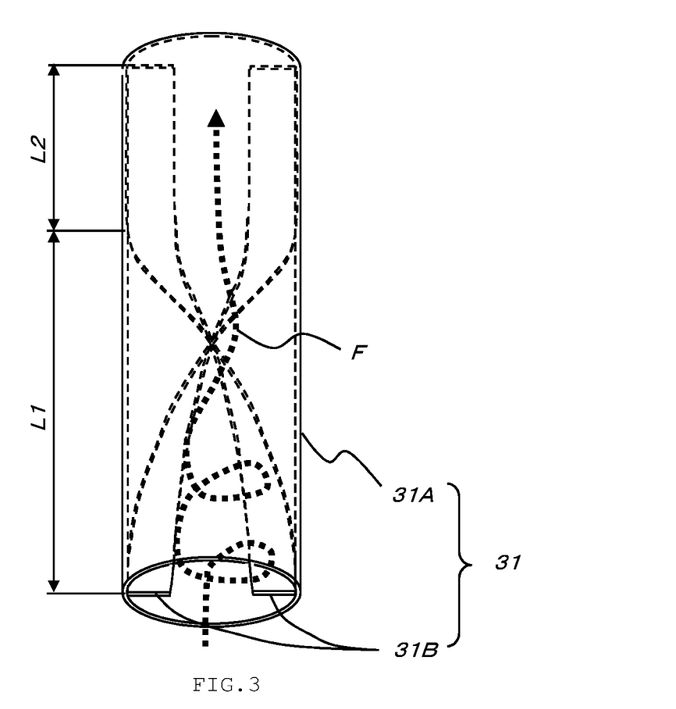
FIG. 3 is a perspective view showing spiral guide blades provided in a cleaning liquid suction pipe in the first embodiment.
Figure 4:
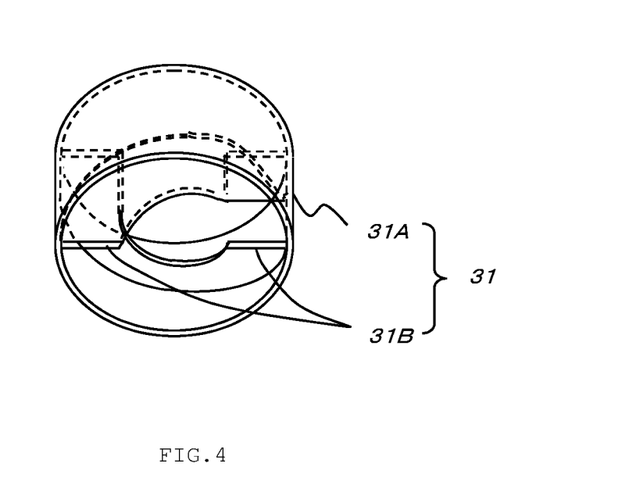
FIG. 4 is a perspective view showing from a different angle the cleaning liquid suction pipe shown in FIG. 3 and the spiral guide blades provided therein.

In FIG. 3 and FIG. 4 showing the detail of the cleaning liquid suction pipe 31, a suction pipe main body 31A and guide members (which will be referred to as "guide plates" hereinafter) 31B are provided to the cleaning liquid suction pipe 31. Here, the two guide plates 31B are provided to be fixed to the inside of the suction pipe main body 31A in the illustrated example.

In FIG. 3, each guide plate 31B has a shape whose bottom suction impeller 1 side (the lower side in FIG. 3: a region denoted by reference numeral L1 in FIG. 3) is spirally twisted and whose multistage centrifugal pump 5 side (the upper side in FIG. 3: a region denoted by reference numeral L2 in FIG. 3) is linearly formed (straight).

When the bottom suction impeller 1 side (the region denoted by reference numeral L1) of the guide plate 31B is spirally twisted and the multistage centrifugal pump 5 side (the region denoted by reference numeral L2) of the same is linearly formed (straight), a swirl flow F4 of the cyclone 3 efficiently enters the multistage centrifugal pump 5.

The swirl flow F4 of the cyclone 3 has a component that swirls in the cyclone 3, and the guide plate 31B preferably has the spirally twisted shape to allow the working fluid constituting the swirl flow F4 to enter the suction pipe main body 31A by using this component.

On the other hand, the working fluid that is sucked into the first stage (the lowermost stage 51 in FIG. 2: the first stage 51 on the suction side) of the multistage centrifugal pump 5 preferably has no circumferential component (is not a swirl flow). If each guide plate 31B is constructed so that the region L2 on the multistage centrifugal pump 5 side linearly extends, the circumferential component of the working fluid can be offset by the linearly extending region of the guide plate 31B, and the circumferential component can be eliminated from the working fluid sucked into the multistage centrifugal pump 5 from the cleaning liquid suction pipe 31.

A flow of the working fluid in the first embodiment will now be described mainly based on FIG. 2 and with reference to FIG. 1.

In the following description, a coolant which is a cooling liquid in a machine tool will be illustrated as the working fluid. This coolant contains foreign matters such as chips produced after cutting using a machine tool.

When the electric motor 7 is started and the number of revolutions of the pump device 100 reaches a predetermined value, the bottom suction impeller 1 sucks the coolant through the cover member 2 having many small-diameter through holes formed therein (a flow line F1 in FIG. 2). The coolant sucked into the bottom suction impeller 1 is spirally discharged to the inner periphery of the bottom portion of the cyclone 3 by rotation of the bottom suction impeller 1, and moves up in the cyclone 3 along a spiral flow line F2.

In the coolant (the flow line F2) that spirally moves up in the cyclone 3, since the coolant that does not contain foreign matters, e.g., chips and is hence clean has a relatively small specific gravity, an influence of centrifugal force that acts when the coolant flows along the flow line F2 is small.

Since the inner peripheral surface 30*i* of the casing 30 of the cyclone 3 is formed into a tapered shape, an inner space and a cross-sectional area of an exit (the outlet for the fluid containing foreign matters) 3*o* of the cyclone 3 are reduced. Thus, in the working fluid that spirally moves up along the casing inner peripheral surface 30*i*, the clean coolant close to the swirl center is turned over (a flow line F3) in the cyclone 3, moves down along the cleaning liquid suction pipe 31 (a flow line F4), swirls around the cleaning liquid suction pipe 31, and enters the cleaning liquid suction pipe 31 from the lower end 31*i* of the cleaning liquid suction pipe 31 (a flow line F5) as characteristics of the cyclone.

In the clean coolant that has entered the cleaning liquid suction pipe 31, the circumferential component of the swirl flow is converted into a vertical component by a region L1 (see FIG. 3) of the guide plates 31B of the cleaning liquid suction pipe 31, and the clean coolant spirally moves up between the guide plates 31B (a flow line F61). Furthermore, the coolant flows upward in a straight line near the inlet 5*i* of the multistage centrifugal pump 5 by the region L2 (see FIG. 3) of the guide plates 31B, and enters the impeller of the first-stage pump unit 51 from the inlet 5*i* of the multistage centrifugal pump 5 (a flow line F7).

The coolant that has entered the multistage centrifugal pump 5 is boosted on each stage (a flow line F8), flows into the working fluid discharge flow passage 64 of the upper housing 6 from the outlet of the fifth-stage pump unit 55 (a flow line F9), and is discharged to the outside of the pump device 100 from the outlet 66 of the housing 6 (a flow line F10).

On the other hand, in the cyclone 3, foreign matters having large specific gravities, e.g., chips in the coolant are entrained by the swirl flow of the coolant indicated by the flow line F2, centrifugally pressed against the casing inner peripheral surface 30*i* of the cyclone 3, and moves up along the casing inner peripheral surface 30*i* by an upward strong flow (a flow Fc11).

As indicated by the flow line Fc11, the coolant that has moved up along the inner peripheral surface 30*i* of the casing 30 (the coolant entraining foreign matters) flows out of the cyclone 3 from the foreign matter outlet 3*o* at the upper end of the casing 30 (a flow line Fc12).

Here, the coolant (the flow line Fc12) that flows to the outside of the cyclone 3 from the foreign matter outlet 3*o* at the upper end of the casing 30 flows in the connection pipe 9 through the annular space (the notch) 30*c* of the lower housing 4 (a flow lien Fc13).

At this time, since the annular space (the notch) 30*c* is positioned below the foreign matter outlet 3*o* at the upper end of the casing 30, foreign matters having large specific gravities do not flow back into the cyclone 3 against the follow of the coolant indicated by the flow line Fc12.

Further, the coolant entraining the foreign matters is discharged to the outside of the pump device 100 from the foreign matter outlet 68H of the upper housing 6 (a flow line Fc14).

Here, since a discharge flow of the bottom suction impeller 1 directly flows into the cyclone 3 and energy (head) applied by the bottom suction impeller 1 generates the swirl flow in the cyclone 3, the foreign matters having large specific gravities do not deposit in the annular space (the notch) 30*c*, and the coolant with a flow rate that can be securely discharged from the foreign matter outlet 68H through the connection pipe 9 can be assured.

According to the illustrated first embodiment, the cyclone 3 is arranged in such a manner that the inner diameter D3 of the cyclone 3 on the bottom suction impeller 1 side (see FIG. 1) becomes large and the inner diameter d3 of the same on the multistage centrifugal pump 5 side (see FIG. 1) becomes small, and the coolant discharged from the bottom suction impeller 1 directly flows into the region of the cyclone 3 on the bottom suction impeller 1 side (the lower side in each of FIG. 1 and FIG. 2). Thus, the coolant having the energy (head) applied thereto by the bottom suction impeller 1 directly flows into the cyclone 3, and the coolant having the energy (head) applied thereto by the bottom suction impeller 1 swirls in the cyclone 3 (the flow line F2).

Since the energy (head) which is necessary and sufficient to flow upward in the cyclone 3 is directly applied to the coolant by the bottom suction impeller 1, the coolant easily and assuredly moves to the multistage centrifugal pump 5 side. Furthermore, when the swirling coolant having the energy necessary and sufficient to flow upward in the cyclone 3 applied thereto moves (flows upward) to the multistage centrifugal pump 5 side in the cyclone 3, the foreign matters and the clean coolant can be assuredly separated from each other by the centrifugal force. Thus, the filtration efficiency in the cyclone 3 is improved.

In the coolant swirl flow that rotates and moves up in the cyclone 3, the large centrifugal force acts on foreign matters having large specific gravities, e.g., metal chips (or the coolant entraining these foreign matters), and hence the foreign matters move to the vicinity of the casing inner peripheral surface 30*i* of the cyclone 3.

On the other hand, the coolant separated from the foreign matters and the clean coolant move in the radially inner region in the cyclone 3, and change their directions toward the bottom suction impeller 1 side (the lower side) as indicated by the flow line F3.

The clean working fluid that has changed its direction to the bottom suction impeller 1 side (the lower side) moves down as indicated by the flow line F4, and flows into the cleaning liquid suction pipe 31 in a region near the bottom suction impeller 1 as indicated by the flow line F5. Furthermore, it flows into the inlet 5*i* of the multistage centrifugal pump 5 (the flow lines F61, F62, and F7).

Moreover, it is discharged as a flow of the clean working fluid from the outlet 66 of the multistage centrifugal pump 5 (the flow lines F8, F9, and F10).

According to the illustrated first embodiment, the coolant that has flowed out of the bottom suction impeller 1 directly flows into the cyclone 3, and the discharge flow (the discharge swirl flow) of the bottom suction impeller 1 directly turns to the swirl flow in the cyclone 3. Since the swirl flow of the coolant is generated in the cyclone 3 by the energy (head) applied by the bottom suction impeller 1, a flow velocity of the swirl flow is high, and the centrifugal separation efficiency is improved.

Thus, as compared with the above-described prior art (Patent Literature 1), i.e., the pump device in which the working fluid discharged from the non-positive displacement pump flows up in the radially outer region of the primary cyclone and then flows into the primary cyclone, the illustrated first embodiment has less loss of the energy (head) applied by the bottom suction impeller 1, which is efficient.

Moreover, according to the illustrated first embodiment, since the swirl flow in the cyclone 3 has a high flow velocity and a large flow rate of the coolant flows into the cyclone 3, the foreign matters having large specific gravities are entrained by the coolant and easily moved to the multistage centrifugal pump 5 side (the upper side). Additionally, they are discharged to the outside of the cyclone 3 from the outlet 3*o* (the outlet for the fluid containing foreign matters) provided near the (upper) end portion on the multistage centrifugal pump 5 side through the connection pipe 9.

In the illustrated first embodiment, since the guide plates 31B are extended in the center axis line direction (an up-and-down direction) of the cleaning liquid suction pipe 31 of the multistage centrifugal pump 5, the swirl flow in the cyclone 3 can be efficiently guided into the cleaning liquid suction pipe 31 to guide the coolant to the inlet 5$i$ of the multistage centrifugal pump 5.

Thus, if the bore diameter D31 of the cleaning liquid suction pipe 31 is 95% to 105% of the bore diameter D51$i$ of the inlet of the multistage centrifugal pump 5, without making said bore diameter D31 enlarged, the amount of the coolant that is sucked by the centrifugal pump 5 is not reduced, and the discharge amount of the centrifugal pump 5 can be prevented from being decreased.

Further, if the bore diameter D31 of the cleaning liquid suction pipe 31 is 95% to 105% of the bore diameter D51$i$ of the inlet of the multistage centrifugal pump 5, a possibility that the coolant containing foreign matters is sucked into the cleaning liquid suction pipe 31 or the multistage centrifugal pump 5 is lowered, and the filtration rate is improved.

In addition, according to the illustrated first embodiment, the coolant swirl flow in the cyclone 3 can be guided into the cleaning liquid suction pipe 31 by the region L1 of the guide plates 31B provided in the cleaning liquid suction pipe 31 on the bottom suction impeller 1 side (the lower side), and moved to the multistage centrifugal pump 5 side (the upper side).

Furthermore, the circumferential component in the flow of the coolant that moves toward the centrifugal pump 5 side in the cleaning liquid suction pipe 31 can be offset by the region L2 of the guide plates 31B on the multistage centrifugal pump 5 side (the upper side).

In the illustrated first embodiment, since the cone member 32 is arranged at the end portion of the cyclone 3 on the multistage centrifugal pump 5 side (the upper side) and it is arranged so that the apex of the conical shape of the cone member 32 faces the bottom suction impeller 1 side (the lower side), the radially inner region of the foreign matter outlet 3$o$ provided near the end portion on the multistage centrifugal pump 5 side is occupied by the cone member 32, and the cross-sectional area (the annular flow passage area) of the outlet 3$o$ is thereby reduced. Consequently, a flow rate of the working fluid containing foreign matters discharged from the outlet 3$o$ can be reduced, and a necessary flow rate of the working fluid discharged from the outlet 66 of the multistage centrifugal pump 5 can be assured.

Moreover, since the cone member 32 is arranged so that the apex of the conical shape of the cone member 32 faces the bottom suction impeller 1 side (the lower side), the flow rate of the working fluid containing foreign matters discharged from the outlet 3$o$ can be assured. Thus, the foreign matters can be readily discharged from the pump device 100, and the filtration rate can be improved.

In the illustrated first embodiment, when a discharge pipeline (not shown) is connected to the foreign matter outlet 68H and an exit of this non-illustrated discharge pipeline is arranged to communicate with the outside of a working fluid reservoir (e.g., a coolant tank: not shown), the foreign matters separated by the cyclone 3 can be readily discharged to the outside of the working fluid reservoir (not shown).

A second embodiment according to the present invention will now be described with reference to FIG. 5.

Figure 5:
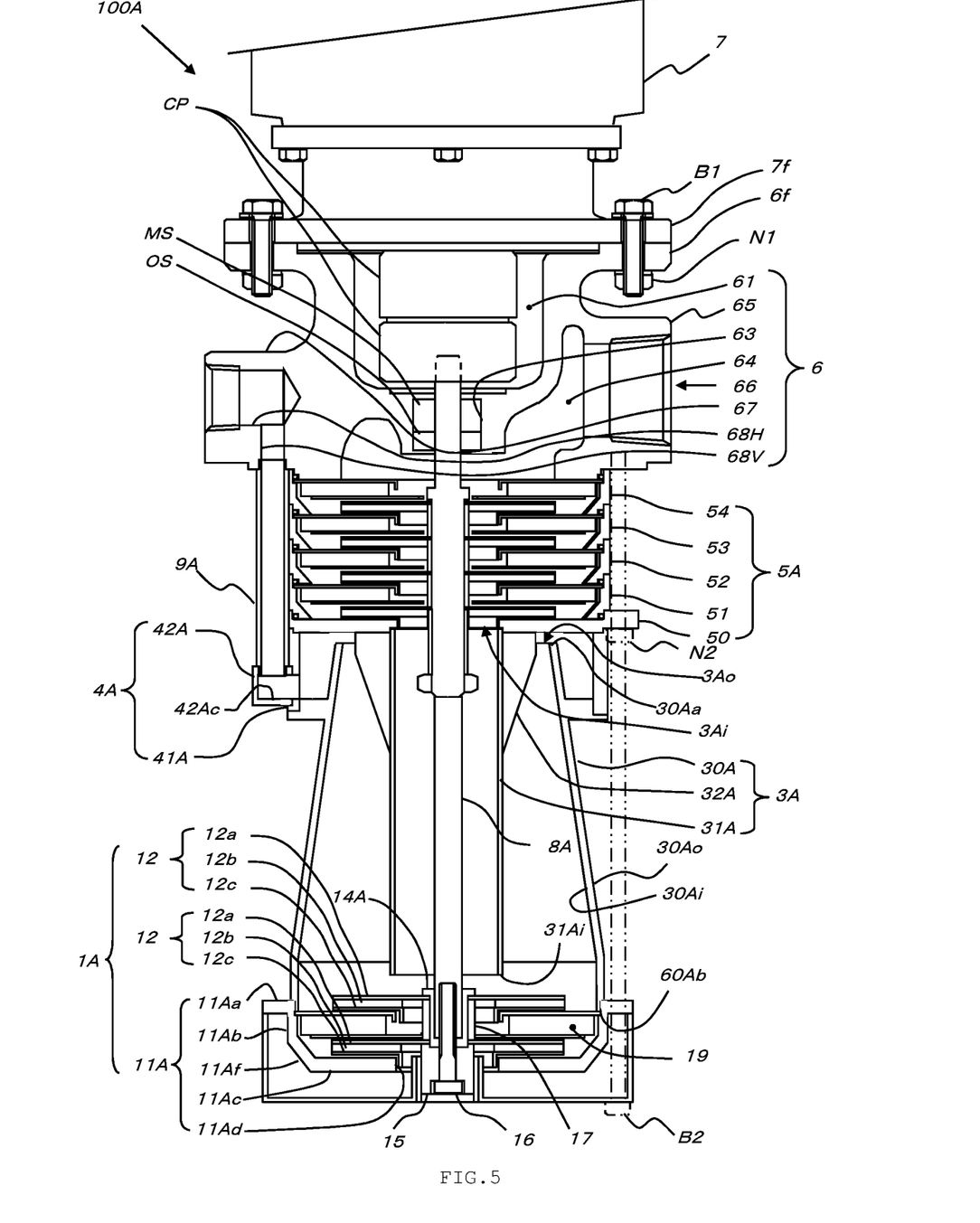
FIG. 5 is a cross-sectional view showing a second embodiment according to the present invention.

The bottom suction impeller 1 has one stage alone and the multistage centrifugal pump 5 has five stages in the first embodiment, whereas a bottom suction impeller has two stages and a multistage centrifugal pump 5A has four stages in the second embodiment shown in FIG. 5. Although not shown, the bottom suction impeller may have three or more stages.

The second embodiment will now be described hereinafter with reference to FIG. 5.

In FIG. 5, with respect to the pump device 100 according to the first embodiment shown in FIG. 1 to FIG. 4, in an entire pump device according to the second embodiment denoted by reference sign 100A, a first housing 6 and an electric motor 7 are commonalized (the same unit).

The outer periphery of the cyclone 3 of the pump device according to the first embodiment has the cylindrical shape, whereas an outer peripheral surface 30Ao of a cyclone 3A according to the second embodiment has a wall thickness decreased to be parallel to an inner peripheral surface 30Ai, thereby achieving weight reduction.

A cone member 32A of the cyclone 3A according to the second embodiment is substantially the same as the cone member 32 of the cyclone 3 according to the first embodiment.

Although a lower housing 4A according to the second embodiment is different from the lower housing 4 according to the first embodiment in a shape of a lower end, but they are the same as a whole. Furthermore, the lower housing 4A according to the second embodiment can be formed to be equal to the lower housing 4 according to the first embodiment.

In FIG. 5, a bottom suction impeller 1A has an impeller housing 11A and two suction impeller main bodies 12. The impeller housing 11A has an upper edge flange portion 11Aa, a cylindrical portion 11Ab, a taper corner portion 11Af, and a bottom portion 11Ac, and a through hole 11Ad is formed at the center of the bottom portion 11$c$.

A sleeve 17 and a guide member 19 are provided between the two suction impeller main bodies 12. The sleeve 17 is a member that exercises an action to maintain a gap between the two suction impeller main bodies 12 as a fixed distance. The guide member 19 is fixed to the impeller housing 11A side.

A multistage centrifugal pump 5A is different from the multistage centrifugal pump 5 according to the first embodiment in the number of stages. Since the number of stages is different from that in the first embodiment, a height dimension of the multistage centrifugal pump 5A is also different from that in the first embodiment, and a length of a connection pipe 9A through which a coolant containing foreign matters flows is also constructed to be shorter than that of the connection pipe 9 in the first embodiment.

Moreover, a dimension of each portion of a pump shaft 8A in a length direction is also different from that of the pump shaft in the first embodiment.

According to the pump device 100A of the second embodiment, providing the bottom suction impellers on two or more stages enables increasing a flow rate of the coolant as compared with the first embodiment, and a suction negative pressure of a cleaning suction pipe 31 can be reduced by adjusting a flow rate of a foreign matter outlet 68H.

Other structures, functions, and effects in the second embodiment shown in FIG. 5 are the same as those of the first embodiment shown in FIG. 1 to FIG. 4.

It is to be noted that the illustrated embodiment is just an exemplification, and it is not a description intended to limit a technical scope of the present invention.

For example, in the illustrated embodiment, the first pump is a non-positive displacement pump (e.g., a centrifugal pump having impeller blades), but the first pump may be constituted of a positive displacement pump (e.g., a gear pump or a so-called "trochoid pump").

Further, although the description has been given as to the case where the coolant is pumped up in the illustrated embodiment, the present invention can be applied to other use applications.

Furthermore, although FIG. 1 to FIG. 5 show the case where bottom suction impeller is provided on the single stage and the case where the bottom suction impellers are provided on the two stages, the bottom suction impellers may be provided on three or more stages.

REFERENCE SIGNS LIST

1 . . . bottom suction impeller
2 . . . cover member
3 . . . cyclone
4 . . . lower housing
5 . . . multistage centrifugal pump
6 . . . upper housing
7 . . . electric motor
8 . . . pump shaft
9 . . . connection pipe
11 . . . impeller housing
12 . . . suction impeller main body
30 . . . casing
31 . . . cleaning liquid suction pipe
32 . . . cone member
51 . . . first-stage pump unit
66 . . . working fluid outlet
68H . . . outlet for a fluid containing foreign matters

The invention claimed is:

1. A pump device, comprising:
a first pump having an inlet for a working fluid; and
a second pump that has a rotary shaft concentric with a rotary shaft of the first pump, and is provided below the inlet of the first pump,
wherein a centrifugal filter that separates foreign matters from the working fluid is provided in a region that is above the second pump and below the inlet of the first pump,
wherein the centrifugal filter is arranged so that its inner diameter on a second pump side becomes large and its inner diameter on a first pump side becomes small, and said centrifugal filter is provided at a position where the working fluid discharged from the second pump directly flows into the centrifugal filter,
wherein a cleaning liquid suction pipe of the first pump is extended towards the second pump along a center axis of the centrifugal filter, the cleaning liquid suction pipe communicates with the inlet of the first pump, a clean working fluid flows in the cleaning liquid suction pipe, and an outlet for a fluid containing foreign matters is provided at a substantially end portion of said centrifugal filter on the first pump side, and
wherein a guide member is extended in the cleaning liquid suction pipe of the first pump along a direction of a center axis of the cleaning liquid suction pipe, the guide member having a first portion that is spirally extended and a second portion being linearly extended straightly in a region being closer to the first pump than the first portion, and
wherein a bore diameter of the cleaning liquid suction pipe is set to at least 95% to at most 105% of a bore diameter of the inlet of the first pump so as to achieve a balance between the filtration rate and the discharge flow rate of the first pump.

2. The pump device according to claim 1, wherein a truncated conical member is arranged at the end portion of the centrifugal filter on the first pump side so that an apex of its conical shape faces the second pump side.

3. The pump device according to claim 1, wherein the outlet for the fluid containing foreign matters provided adjacent the end portion of said centrifugal filter on the first pump side communicates with a foreign matter outlet through a flow passage for the fluid containing foreign matters.

4. The pump device according to claim 3, wherein a truncated conical member is arranged at the end portion of the centrifugal filter on the first pump side so that an apex of its conical shape faces the second pump side.

* * * * *